(12) United States Patent
Seo et al.

(10) Patent No.: US 10,136,238 B2
(45) Date of Patent: *Nov. 20, 2018

(54) AUDIO SYSTEM AND METHOD FOR PREDICTING ACOUSTIC FEATURE

(71) Applicant: Electronics and Telecommunications Research Institute, Daejeon (KR)

(72) Inventors: Jeong Il Seo, Daejeon (KR); Tae Jin Park, Daejeon (KR); Jae Hyoun Yoo, Daejeon (KR); Yong Ju Lee, Daejeon (KR); Jung Woo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,608

(22) Filed: Jul. 31, 2015

(65) Prior Publication Data

US 2016/0100269 A1    Apr. 7, 2016

(30) Foreign Application Priority Data

Oct. 6, 2014    (KR) .......................... 10-2014-0134387

(51) Int. Cl.
*H04R 5/04*    (2006.01)
*H04S 5/00*    (2006.01)
(Continued)

(52) U.S. Cl.
CPC .............. *H04S 7/301* (2013.01); *H04R 3/12* (2013.01); *A63H 17/42* (2013.01); *G01S 7/524* (2013.01);
(Continued)

(58) Field of Classification Search
CPC .......... G01S 7/524; G01S 15/89; G01S 7/534; G01S 15/32; H04R 5/04; H04R 29/004;
(Continued)

(56) References Cited

U.S. PATENT DOCUMENTS 5,398,003 A * 3/1995 Heyl ..................... H03F 3/2173
330/10
6,111,957 A * 8/2000 Thomasson ............ H04R 29/00
381/103
(Continued)

FOREIGN PATENT DOCUMENTS

JP    2005159518 A    6/2005
JP    2006013711 A    1/2006
(Continued)

*Primary Examiner* — Davetta W Goins
*Assistant Examiner* — Kuassi Ganmavo
(74) *Attorney, Agent, or Firm* — William Park & Associates Ltd.

(57) ABSTRACT

An audio system and method using indoor response estimation are disclosed. An acoustic feature prediction method of the audio system may include generating a detection signal based on an input signal and a modulation code; generating an acoustic signal based on the detection signal and outputting the acoustic signal to a plurality of speakers; measuring acoustic signals output from the speakers where the speakers are installed; and predicting acoustic features related to the speakers based on the measured acoustic signals and the modulation code.

12 Claims, 8 Drawing Sheets

(51) Int. Cl.

| | | |
|---|---|---|
| *H04S 7/00* | (2006.01) | |
| *H04R 3/12* | (2006.01) | |
| *A63H 17/42* | (2006.01) | |
| *H04S 3/00* | (2006.01) | |
| *G01S 7/524* | (2006.01) | |
| *G01S 15/89* | (2006.01) | |
| *H04R 29/00* | (2006.01) | |
| *H04R 1/40* | (2006.01) | |

(52) U.S. Cl.
CPC .............. *G01S 15/89* (2013.01); *H04R 1/403* (2013.01); *H04R 5/04* (2013.01); *H04R 29/004* (2013.01); *H04R 2201/403* (2013.01); *H04R 2203/12* (2013.01); *H04R 2420/03* (2013.01); *H04S 3/002* (2013.01); *H04S 7/304* (2013.01)

(58) Field of Classification Search
CPC .. H04R 2430/21; H04R 2420/05; H04R 3/12; H04R 1/403; H04R 2201/403; H04R 2203/12; H04R 2420/03; H04R 2400/15; H04S 7/301; H04S 7/304; H04S 3/002; H04B 1/202; G08C 2201/31
See application file for complete search history.

(56) References Cited

U.S. PATENT DOCUMENTS

| | | | |
|---|---|---|---|
| 6,434,194 B1* | 8/2002 | Eisenberg | H04B 1/406 375/238 |
| 7,103,187 B1* | 9/2006 | Neuman | H04S 7/301 381/109 |
| 8,223,992 B2 | 7/2012 | Suzuki et al. | |
| 8,325,952 B2 | 12/2012 | Cho | |
| 8,363,851 B2 | 1/2013 | Suzuki | |
| 8,594,350 B2 | 11/2013 | Hooley et al. | |
| 8,638,959 B1* | 1/2014 | Hall | H04S 3/008 381/160 |
| 2001/0043652 A1* | 11/2001 | Hooley | H03K 7/08 375/238 |
| 2005/0271150 A1* | 12/2005 | Moore | H04B 1/71632 375/259 |
| 2006/0050891 A1* | 3/2006 | Bharitkar | H04R 29/001 381/59 |
| 2006/0062399 A1* | 3/2006 | McKee Cooper | G01S 11/14 381/58 |
| 2006/0148519 A1* | 7/2006 | Simpson | G01V 3/102 455/556.1 |
| 2006/0153391 A1 | 7/2006 | Hooley et al. | |
| 2006/0256970 A1* | 11/2006 | Asada | H04S 7/301 381/17 |
| 2006/0262940 A1* | 11/2006 | Asada | H04R 29/001 381/58 |
| 2007/0036366 A1 | 2/2007 | Konagai et al. | |
| 2007/0086597 A1* | 4/2007 | Kino | H04S 7/301 381/59 |
| 2008/0165993 A1 | 7/2008 | Cho | |
| 2011/0091042 A1 | 4/2011 | Ko et al. | |
| 2012/0070021 A1 | 3/2012 | Yoo et al. | |
| 2012/0086597 A1* | 4/2012 | Sin | G01S 19/21 342/357.23 |
| 2012/0288124 A1* | 11/2012 | Fejzo | H04R 5/02 381/303 |
| 2013/0058492 A1* | 3/2013 | Silzle | H04R 5/027 381/59 |
| 2013/0170652 A1 | 7/2013 | Yoo et al. | |
| 2013/0230180 A1* | 9/2013 | Thormundsson | H04R 29/00 381/56 |
| 2013/0243211 A1 | 9/2013 | Kondo et al. | |
| 2014/0205100 A1* | 7/2014 | Faller | H04S 1/002 381/17 |
| 2014/0358532 A1* | 12/2014 | Lin | H04S 7/305 704/226 |
| 2014/0369529 A1* | 12/2014 | Quinn | H03F 1/0233 381/121 |
| 2015/0263692 A1 | 9/2015 | Bush | |
| 2015/0312690 A1 | 10/2015 | Yuyama et al. | |

FOREIGN PATENT DOCUMENTS

| | | | |
|---|---|---|---|
| JP | 2012242597 A | 12/2012 | |
| KR | 1020130068251 A | 6/2013 | |
| KR | 1020160040891 A | 4/2016 | |
| WO | WO 0134264 A1 * | 5/2001 | ............ A63H 17/42 |

\* cited by examiner

AUDIO SYSTEM AND METHOD FOR PREDICTING ACOUSTIC FEATURE

CROSS-REFERENCE TO RELATED APPLICATION

This application claims the priority benefit of Korean Patent Application No. 10-2014-0134387, filed on Oct. 6, 2014, in the Korean Intellectual Property Office, the disclosure of which is incorporated herein by reference.

BACKGROUND

1. Field of the Invention

Embodiments of the present invention relate to an audio system and a method for outputting a multichannel audio signal, and more particularly, to an audio system and a method for predicting an acoustic feature of a space where an audio system is installed and outputting a multichannel audio signal optimized based on a prediction result.

2. Description of the Related Art

Audio systems reproducing a sound field using a plurality of speakers are being developed, such as soundbar. The audio systems reproducing the sound field include an audio system which outputs sound beams to a wall of a space where the audio system is installed using a speaker array including a plurality of speakers to provide effect as if the sound beams reflected from the wall comes from a virtual speaker present on the wall.

However, an optimal angle at which the sound beams are to be reflected may vary depending on the area of the space where the audio system is installed, the shape and size of the wall, and the position of a user. Thus, a conventional audio system includes a separate acoustic sensor and measures sound pressure by a sound beam using the acoustic sensor while changing the direction of the sound beam to estimate acoustic features, thereby determining the angle of the sound beam optimized for the position of a user and the space where the audio system is installed.

However, the conventional audio system needs to measure a sound pressure level while changing the direction of each sound beam and thus involves much time in measurement. Moreover, when noise is infiltrated while measuring the sound pressure, a position at which the sound pressure rises may change, making it possible to determine an angle which is not optimal as an optimized angle of the sound beam.

Thus, there is requested a method of quickly measuring acoustic features of the space where an audio system is installed and minimizing effects of noise.

SUMMARY

An aspect of the present invention provides an apparatus and a method for accurately predicting acoustic features of speakers of an audio system or acoustic features of a space where the speakers are installed.

Another aspect of the present invention also provides an apparatus and a method for minimizing effects of noise on response estimation in a particular direction.

Still another aspect of the present invention also provides an apparatus and a method for outputting an audio signal optimized for a space where an audio system is installed.

According to an aspect of the present invention, there is provided a method of predicting an acoustic feature, the method including generating a detection signal based on an input signal and a modulation code; generating an acoustic signal based on the detection signal and outputting the acoustic signal to a plurality of speakers; measuring acoustic signals output from the speakers where the speakers are installed; and predicting acoustic features related to the speakers based on the measured acoustic signals and the modulation code.

The generating of the detection signal may generate a plurality of channels based on a single-channel input signal and modulate at least one of the channels with the modulation code to generate the detection signal.

The generating of the detection signal may reverse polarity of at least one of the channels based on the modulation code to generate the detection signal.

The generating of the detection signal may activate at least one of the channels based on the modulation code to generate the detection signal.

The modulation code may control whether to activate or inactivate the channels or whether to reverse polarity of the channels.

The modulation code may be configured as a combination of codes for controlling whether to activate or inactivate the channels or whether to reverse polarity of the channels.

The outputting of the acoustic signal may generate an acoustic signal with no directivity based on the detection signal to output the acoustic signal to the plurality of speakers.

The acoustic features may include at least one of an acoustic propagation feature of each of the speakers and a response feature of the space where the speakers are installed.

According to another aspect of the present invention, there is provided a method of generating an audio signal, the method of including receiving predicted acoustic features with respect to a plurality of speakers; modulating an audio signal based on the acoustic features to generate an audio signal optimized for a space where the speakers are installed; and generating an acoustic signal based on the optimized audio signal to output the acoustic signal to the speakers.

The acoustic features may include at least one of an acoustic propagation feature of each of the speakers and a response feature of the space where the speakers are installed.

The acoustic features may be predicted based on measured acoustic signals and a modulation code by generating a detection signal based on an input signal and the modulation code and measuring an acoustic signal output based on the detection signal where the speakers are installed.

According to still another aspect of the present invention, there is provided an apparatus for predicting an acoustic feature, the apparatus including a detection signal generation unit to generate a detection signal based on an input signal and a modulation code; an acoustic signal output unit to generate an acoustic signal based on the detection signal and to output the acoustic signal to a plurality of speakers; an acoustic signal measurement unit to measure acoustic signals output from the speakers where the speakers are installed; and an acoustic feature prediction unit to predict acoustic features related to the speakers based on the measured acoustic signals and the modulation code.

According to yet another aspect of the present invention, there is provided a n apparatus for generating an audio signal, the apparatus of including an acoustic feature reception unit to receive predicted acoustic features with respect to a plurality of speakers; an audio signal generation unit to modulate an audio signal based on the acoustic features to generate an audio signal optimized for a space where the speakers are installed; and an acoustic signal output unit to generate an acoustic signal based on the optimized audio signal to output the acoustic signal to the speakers.

As described above, according to an aspect of the present invention, acoustic signals output based on detection signals generated using different modulation codes may be measured and acoustic features of speakers outputting the acoustic signals or acoustic features of a space where the speakers are installed may be predicted based on the measured acoustic signals and the modulation codes, thereby accurately predicting the acoustic features of the speakers or the space of the speakers.

According to another aspect of the present invention, a plurality of speakers may be simultaneously excited based on a detection signal to output acoustic signals, thereby minimizing effect of noise on response estimation in a particular direction.

According to still another aspect of the present invention, an audio signal may be modulated and output based on a predicted acoustic feature, thereby outputting the audio signal optimized for a space where an audio system is installed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments of the present invention will be described in detail with reference to the accompanying drawings. A method of predicting an acoustic feature and a method of generating an audio signal according to exemplary embodiments may be performed by an audio system.

Figure 1:
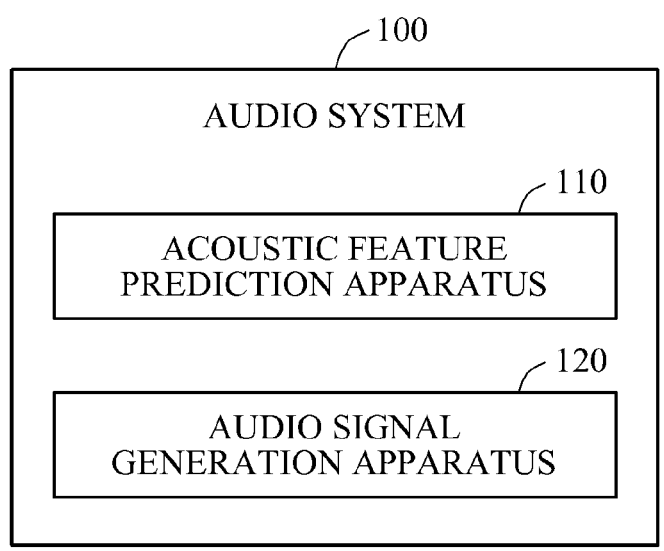
FIG. 1 illustrates an audio system according to an embodiment of the present invention.

FIG. 1 illustrates an audio system according to an embodiment of the present invention.

The audio system 100 according to the present embodiment may output multichannel audio signals to a plurality of speakers to reproduce a sound field.

Referring to FIG. 1, the audio system 100 according to the present embodiment may include an acoustic feature prediction apparatus 110 and an audio signal generation apparatus 120.

The acoustic feature prediction apparatus 110 may predict acoustic features of a space where the audio system 100 is installed and the respective speakers using a detection signal. Here, the detection signal may be a signal for outputting an acoustic signal with no directivity from the speakers. The detection signal may also change or inactivate polarity of at least one channel of channels respectively corresponding to the speakers according to a modulation code or digital code data set.

The acoustic features of the space where the audio system 100 is installed may represent changes in acoustic signals simultaneously output from the plurality of speakers due to reflection of the acoustic signals from a wall of the space where the audio system 100 is installed. Here, the acoustic features of the space may change depending on a number of speakers outputting acoustic signals. The acoustic features of the respective speakers may represent features of acoustic signals output by the respective speakers.

A detailed configuration and operations of the acoustic feature prediction apparatus 110 will be described in detail with reference to FIG. 2.

The audio signal generation apparatus 120 may modulate an audio signal with reference to the acoustic features predicted by the acoustic feature prediction apparatus 110 to generate an audio signal optimized for the space of the audio system 100. The audio signal generation apparatus 120 may output acoustic signals based on the optimized audio signal through the speakers, thereby reproducing a sound field optimized for the space of the audio system 100.

A detailed configuration and operations of the audio signal generation apparatus 120 will be described in detail with reference to FIG. 4.

Figure 2:
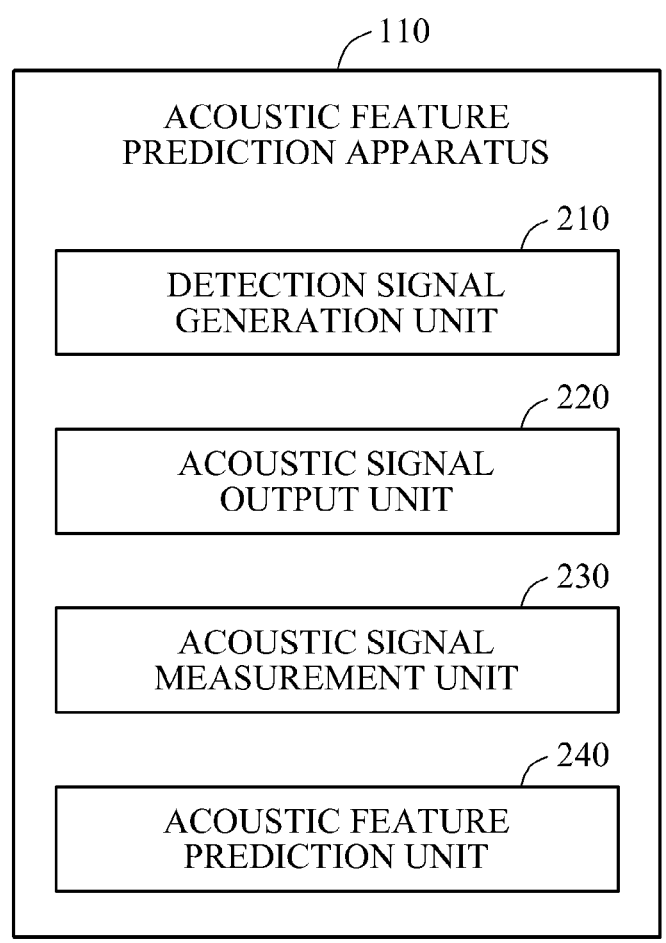
FIG. 2 illustrates an acoustic feature prediction apparatus of the audio system according to an embodiment of the present invention.

FIG. 2 illustrates the acoustic feature prediction apparatus of the audio system according to an embodiment of the present invention.

Referring to FIG. 2, the acoustic feature prediction apparatus 110 according to the present embodiment may include a detection signal generation unit 210, an acoustic signal output unit 220, an acoustic signal measurement unit 230 and an acoustic feature prediction unit 240.

The detection signal generation unit 210 may generate a detection signal based on an input signal and a modulation code. Here, the input signal may be a single-channel signal for identifying an acoustic signal propagation feature between an acoustic signal sensor and speakers.

In detail, the detection signal generation unit 210 may generate a plurality of channels based on the single-channel input signal and modulate at least one of the channels using the modulation code to generate a detection signal.

For example, the detection signal generation unit 210 may reverse polarity of at least one of the channels depending on the modulation code to generate a detection signal. Further, the detection signal generation unit 210 may activate at least one of the channels depending on the modulation code to generate a detection signal.

Here, the modulation code may be a digital modulation code corresponding to each channel or a digital code data set corresponding to all of the channels. Here, the digital modulation code may be information for reversing polarity of at least one of the channels or activating only part of the channels. For instance, the digital modulation code may have one value among a, −a and 0. The detection signal generation unit 210 may activate a channel with a digital modulation code of a, reverse polarity of a channel with a digital modulation code of −a, and inactivate a channel with a digital modulation code of 0. The digital code data set may be configured as a combination of various digital modulation codes corresponding to a number of speakers.

That is, the channels included in the detection signal may not include phase differences among the channels or time delays among the channels since only activation or inactivation states and polarities of the channels are different.

The acoustic signal output unit 220 may generate an acoustic signal having a particular pattern based on the detection signal generated by the detection signal generation unit 210 to output the acoustic signal to the plurality of speakers. Here, the speakers may be speakers included in the audio system 100 to output multichannel audio signals. For instance, the speakers may be array speakers disposed in a row, 7.1-channel speakers, or 10.2-channel speakers. Further, the acoustic signal output unit 220 may include a multichannel amplifier to amplify detection signals and to transmit the signals to the speakers.

The acoustic signals output by the acoustic signal output unit 220 may be an acoustic signal with no directivity depending on a characteristic of the modulation code.

The acoustic signal output unit 220 may simultaneously excite the plurality of speakers based on the detection signal to output acoustic signals, thereby not affecting response estimation in a particular direction even though noise occurs in the acoustic signal.

The acoustic signal measurement unit 230 may measure acoustic signals output from the speakers where the speakers are installed. Here, the acoustic signal measurement unit 230 may measure at a time, using at least one acoustic signal sensor, an acoustic signal reflected from the wall among the acoustic signals output from the speakers and an acoustic signal not reflected from the wall among the acoustic signals output from the speakers. The acoustic signal sensor may be installed in a place where a user is likely to be.

The acoustic feature prediction unit 240 may predict acoustic features related to the speakers based on the acoustic signals measured by the acoustic signal measurement unit 230 and the modulation code. Here, the acoustic features may include at least one of an acoustic signal propagation feature of each speaker and a response feature of the space where the speakers are installed.

The acoustic feature prediction apparatus 110 may measure the acoustic signals output based on the detection signal N times, and the acoustic feature prediction unit 240 may predict acoustic features of a space where the audio system 100 is installed and acoustic features of the respective speakers based on the acoustic signals measured N times.

Here, the acoustic feature prediction apparatus 110 may generate a control parameter for controlling an audio signal based on the predicted acoustic features or a response signal based on the predicted acoustic features. The acoustic feature prediction apparatus 110 may transmit the control parameter or response signal to the audio signal generation apparatus 120.

In detail, the detection signal generation unit 210 may generate N pattern sets by combining digital modulation codes. Here, the generated pattern sets may include pattern sets of digital modulation codes combined in different patterns.

The detection signal generation unit 210 may include N digital code data sets. Here, the N digital code data sets may have different patterns of codes corresponding to the respective channels.

Next, the detection signal generation unit 210 may sequentially generate N different detection signals using the N pattern sets or the N digital code data sets.

Subsequently, the acoustic signal output unit 220 may sequentially output N acoustic signals with different patterns according to the N detection signals generated by the detection signal generation unit 210.

The acoustic signal measurement unit 230 may measure the N acoustic signals sequentially output by the detection signal output unit 220. Here, the acoustic signals measured by the acoustic signal measurement unit 230 may include an acoustic signal reflected from the wall and an acoustic signal not reflected from the wall.

Finally, the acoustic feature prediction unit 240 may predict the acoustic features related to the speakers by referring to the N pattern sets or the N digital code data sets used for the detection signal generation unit 210 to generate the detection signals and the N acoustic signals measured by the acoustic signal measurement unit 230. For example, the acoustic feature prediction unit 240 may predict a user response to sound beams output in a plurality of directions. Also, when virtual speakers are formed at a plurality of positions using a virtual speaker forming technique, for example, wave field synthesis (WFS), the acoustic feature prediction unit 240 may predict response features of a space where the virtual speakers are formed.

That is, the acoustic feature prediction apparatus 110 may measure the acoustic signals output based on the detection signals generated with different modulation codes and predict the acoustic features of the speakers outputting the acoustic signals or the acoustic features of the space where the speakers are installed based on the measured acoustic signals and the modulation codes, thereby accurately predicting the acoustic features of the speakers or the space of the speakers.

Figure 3:
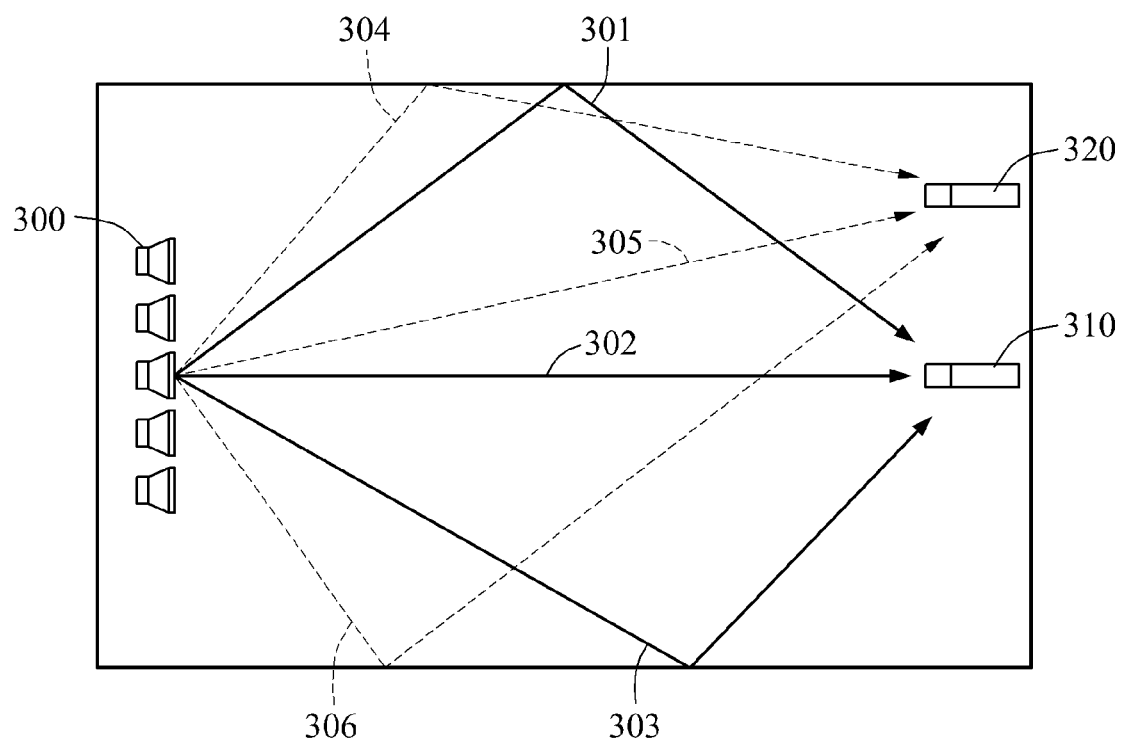
FIG. 3 illustrates a process of predicting an acoustic feature of a space where the audio system is installed according to an embodiment of the present invention.

FIG. 3 illustrates a process of predicting an acoustic feature of a space where the audio system is installed according to an embodiment of the present invention.

Speakers 300 of the audio system 100 may output acoustic signals corresponding to respective detection signals. Here, at least one of the speakers 300 may be inactivated based on a channel of a detection signal and not output an acoustic signal. Further, at least one of the speakers 300 may output an acoustic signal with a different polarity based on a channel of a detection signal.

The acoustic signal measurement unit 230 may dispose at least one acoustic sensor in a space where the speakers 300 are installed. Here, the acoustic sensor may be installed at a position where users are highly likely to be. For example, a first acoustic sensor 310 may be installed at a center where users are most likely to be. A second acoustic sensor 320 may be installed at a different position from that of the first acoustic sensor 310 to measure a sound of the position. Accordingly, when a user is close to the second acoustic sensor 320, the second acoustic sensor 320 may predict an acoustic feature optimized for the user.

Sounds measured by the acoustic sensors may include acoustic signals transmitted directly to the acoustic sensors and an acoustic signal reflected from a wall among the acoustic signals output from the speakers 300.

For instance, the first acoustic sensor 310 may measure an acoustic signal 301 reflected from a right wall of the space, an acoustic signal 320 output from the speakers 300 and transmitted without reflection and modulation, and an acoustic signal 303 reflected from a left wall of the space among the acoustic signals output from the speakers 300. The second acoustic sensor 320 may measure an acoustic signal 304 reflected from the right wall of the space, an acoustic signal 305 output from the speakers 300 and transmitted without reflection and modulation, and an acoustic signal 306 reflected on the left wall of the space among the acoustic signals output from the speakers 300.

Here, since the first acoustic sensor 310 and the second acoustic sensor 320 are installed at different positions, the acoustic signals 301, 302, 303, 304, 305 and 306 may have different traveling times and distances. Thus, the acoustic signals 301, 302, 303, 304, 305 and 306 may have some different parameters.

The acoustic feature prediction unit 240 may compare parameters of the acoustic signals changed by reflection and modulation of the acoustic signals with modulation codes relating to generation of the acoustic signals, thereby predicting acoustic features of the speakers 300 and the space where the speakers 300 are installed.

Figure 4:
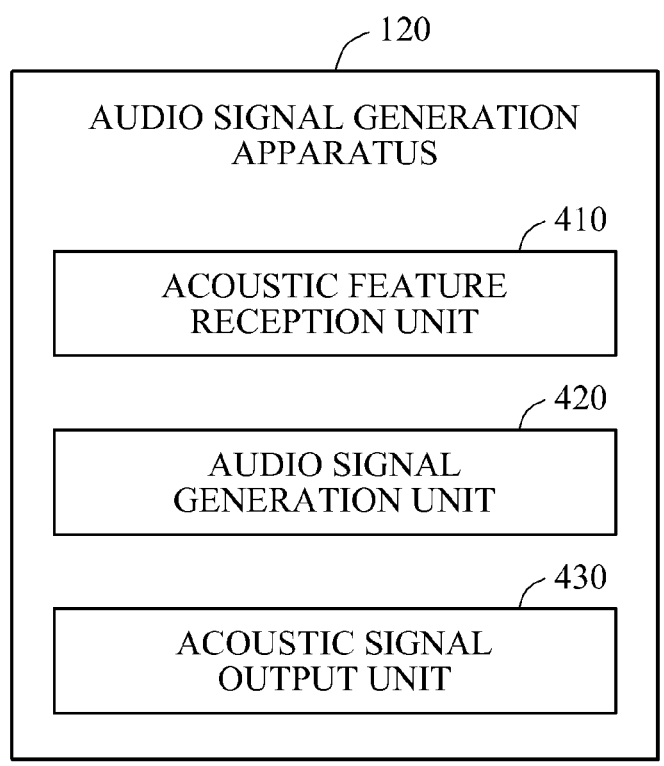
FIG. 4 illustrates an audio signal generation apparatus of the audio system according to an embodiment of the present invention.

FIG. 4 illustrates the audio signal generation apparatus of the audio system according to an embodiment of the present invention.

Referring to FIG. 4, the audio signal generation apparatus 120 according to the present embodiment may include an acoustic feature reception unit 410, an audio signal generation unit 420 and an acoustic signal output unit 430.

The acoustic feature reception unit 410 may receive acoustic features predicted with respect to a plurality of speakers. Here, the predicted acoustic features may be acoustic features predicted by the acoustic feature prediction apparatus 110. The acoustic feature reception unit 410 may receive control parameters based on the acoustic features predicted by the acoustic feature prediction apparatus 110 or response signals based on the predicted acoustic features.

The audio signal generation unit 420 may modulate an audio signal based on the acoustic features received by the acoustic feature reception unit 410 to generate an audio signal optimized for a space where the speakers are installed. Here, the audio signal may be a multichannel audio signal including a plurality of channels.

When the acoustic feature prediction apparatus 110 and the audio signal generation apparatus 120 are configured as a single apparatus, the audio signal generation unit 420 may have functions of the audio feature reception unit 410.

The acoustic signal output unit 430 may generate acoustic signals based on the audio signal optimized by the audio signal generation unit 420 to output the acoustic signals to the speakers of the audio system 100. Here, the acoustic signal output unit 430 may be the same component as the acoustic signal output unit 220 of the acoustic feature prediction apparatus 110.

The audio signal generation apparatus 120 may modulate the audio signal based on the acoustic features predicted by the acoustic feature prediction apparatus 110 for output, thereby outputting the audio signal optimized for a space where the audio system is installed.

Figure 5:
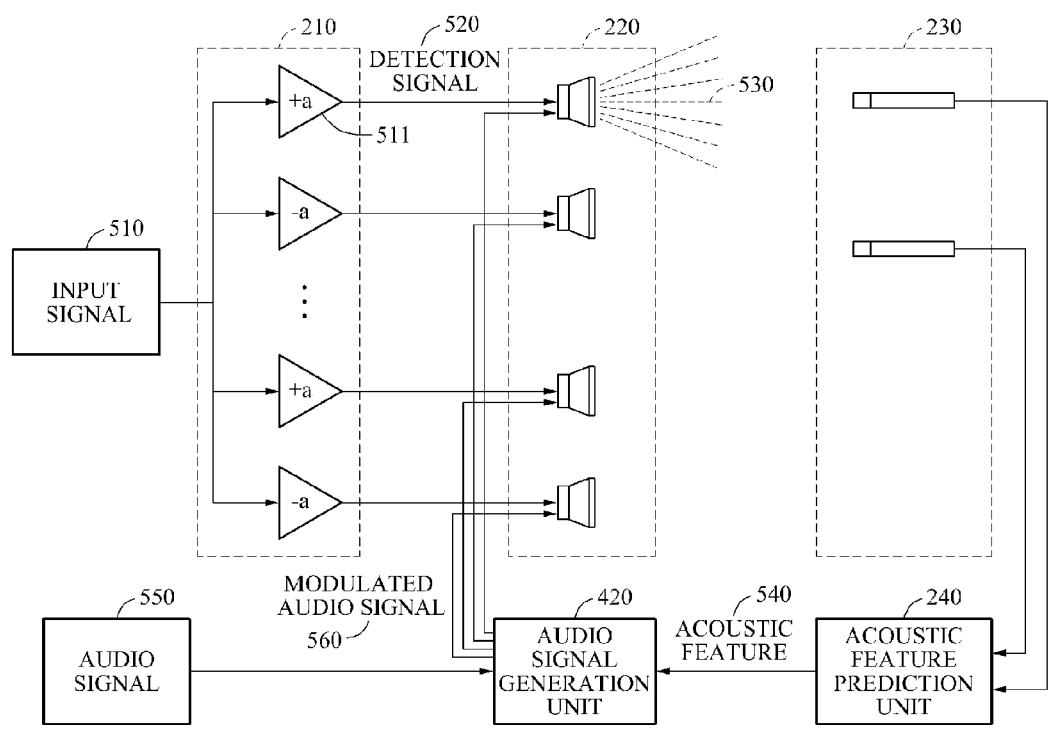
FIG. 5 illustrates an audio system according to an embodiment of the present invention.

FIG. 5 illustrates an audio system according to an embodiment of the present invention.

The acoustic feature prediction apparatus 110 and the audio signal generation apparatus 120 may be configured as separate apparatuses or as a single apparatus. FIG. 5 illustrates a configuration and operations of the audio system 100 when the audio system 100 is a single apparatus including both the acoustic feature prediction apparatus 110 and the audio signal generation apparatus 120.

As illustrated in FIG. 5, the audio system 100 may include a detection signal generation unit 210, an acoustic signal output unit 220, an acoustic signal measurement unit 230, an acoustic feature prediction unit 240 and an audio signal generation unit 420.

First, the detection signal generation unit 210 may generate N pattern sets by combining digital modulation codes. Here, the generated pattern sets may be pattern sets of digital modulation codes combined in different patterns. A number of digital modulation codes included in the pattern sets may be determined based on a number of channels corresponding to respective speakers.

The detection signal generation unit 210 may receive a single-channel input signal 510. Here, the detection signal generation unit 210 may generate a detection signal 520 using one of the N pattern sets for the single-channel input signal 510.

Here, the detection signals 520 may include a plurality of channels corresponding to the respective speakers. At least one of the channels included in the detection signal 520 may be activated depending on a digital modulation code included in the pattern sets. Further, at least one of the channels included in the detection signal 520 may have a reversed polarity of −a depending on a digital modulation code included in the pattern sets.

The acoustic signal output unit 220 may generate an acoustic signal 530 based on the detection signal 520 generated by the detection signal generation unit 210 to output the acoustic signal 530 to the plurality of speakers. Here, the acoustic signal 530 may include an acoustic signal with polarity reversed based on the detection signal 520. When at least one channel in the detection signal 520 is inactivated, a speaker corresponding to the inactivated channel may not output acoustic signals 530.

The acoustic signal measurement unit 230 may measure the acoustic signal 530 output by the acoustic signal output unit 220. Here, the acoustic signal measured by the acoustic signal measurement unit 230 may include an acoustic signal reflected from a wall and an acoustic signal not reflected from the wall.

The acoustic feature prediction unit 240 may predict an acoustic feature 540 related to the speakers by referring to the pattern sets used for the detection signal generation unit 210 to generate the detection signal and the acoustic signal 530 measured by the acoustic signal measurement unit 230. Here, the audio system 100 may repeat processes of generating the detection signal 520 and measuring the acoustic signal 530 N times and predict at least one of an acoustic propagation feature of the speakers and a response feature of the space where the audio system 100 is installed by referring to the N pattern sets in combination with the acoustic signal 530 measured N times.

The audio signal generation unit 420 may receive the acoustic feature 540 from the acoustic feature prediction unit 240. Here, the acoustic feature 540 transmitted from the acoustic feature prediction unit 240 to the audio signal generation unit 420 may include at least one of a control parameter based on the predicted acoustic feature and a response signal based on the predicted acoustic feature.

The audio signal generation unit 420 may receive an audio signal 550 to reproduce through the audio system. Here, the audio signal generation unit 420 may modulate the audio signal based on the received acoustic feature 540 to generate an audio signal 560 optimized for the space where the audio system 100 is installed.

Finally, the audio signal generation unit 420 may transmit the audio signal 560 modulated optimally for the space to the acoustic signal output unit 220. Here, the acoustic signal output unit 220 may generate an acoustic signal based on the received audio signal 560 to output the audio signal to the speakers, thereby reproducing a sound field corresponding to the audio signal 550 optimized for the space where the audio system 100 is installed.

Figure 6:
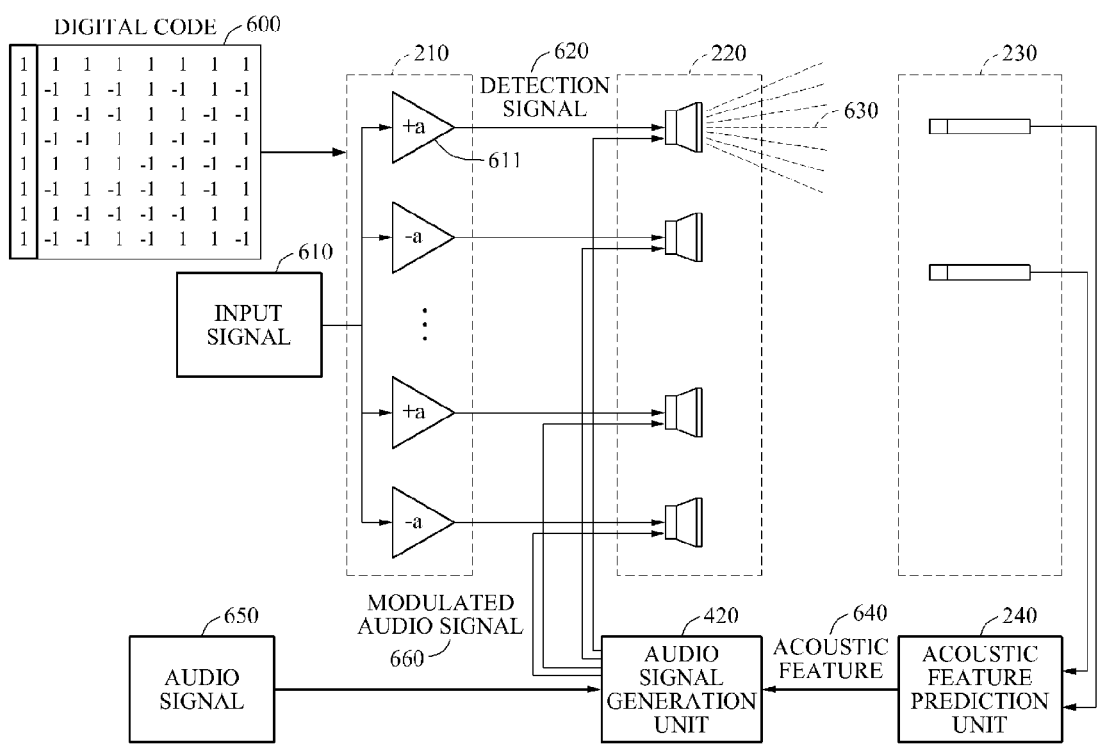
FIG. 6 illustrates an audio system according to another embodiment of the present invention.

FIG. 6 illustrates an audio system according to another embodiment of the present invention.

FIG. 6 shows the audio system which predicts an acoustic feature using N digital code data sets and modulates an audio signal. Here, the N digital code data sets may have different patterns of codes corresponding to respective channels.

As illustrated in FIG. 6, the audio system 100 may include a detection signal generation unit 210, an acoustic signal output unit 220, an acoustic signal measurement unit 230, an acoustic feature prediction unit 240 and an audio signal generation unit 420.

The detection signal generation unit 210 may receive N digital code data sets 600. Here, the digital code data sets 600 may be configured as a combination of codes corresponding to respective channels included in a detection signal.

The detection signal generation unit 210 may receive a single-channel input signal 610. Here, the detection signal generation unit 210 may generate a detection signal 620 using one of the N digital code data sets for the single-channel input signal 610.

Here, the detection signal 620 may include a plurality of channels corresponding to respective speakers. At least one of the channels included in the detection signal 620 may be activated depending on a digital modulation code included in the digital code data sets 600. For instance, the detection signal generation unit 210 may activate a channel with a code set to 1 or −1 in the digital code data sets 600. Further, the detection signal generation unit 210 may inactivate a channel with a code set to 0 in the digital code data sets 600.

At least one of the channels included in the detection signal 620 may have a reversed polarity of −a based on a digital modulation code included in the digital code data sets. For example, the detection signal generation unit 210 may maintain polarity of a channel with a code set to 1 in the digital code data sets 600 to be a. Also, the detection signal generation unit 210 may reverse polarity of a channel with a code set to −1 in the digital code data sets 600 to −a.

The acoustic signal output unit 220 may generate an acoustic signal 630 based on the detection signal 620 generated by the detection signal generation unit 210 and output the acoustic signal 630 to the plurality of speakers. Here, the acoustic signal 630 may include an acoustic signal with polarity reversed based on the detection signal 620. When at least one channel is inactivated in the detection signal 620, a speaker corresponding to the inactivated channel may not output the acoustic signal 630.

The acoustic signal measurement unit 230 may measure the acoustic signal 630 output by the acoustic signal output unit 220. Here, the acoustic signal measured by the acoustic signal measurement unit 230 may include an acoustic signal reflected from a wall and an acoustic signal not reflected from the wall.

The acoustic feature prediction unit 240 may predict an acoustic feature 640 related to the speakers by referring to the digital code data sets used for the detection signal generation unit 210 to generate the detection signal and the acoustic signal 630 measured by the acoustic signal measurement unit 230. Here, the audio system 100 may repeat processes of generating the detection signal 620 and measuring the acoustic signal 630 N times and predict at least one of an acoustic propagation feature of the speakers and a response feature of a space where the audio system 100 is installed by referring to the N digital code data sets in combination with the acoustic signal 630 measured N times.

The audio signal generation unit 420 may receive the acoustic feature 640 from the acoustic feature prediction unit 240. Here, the acoustic feature 640 transmitted from the acoustic feature prediction unit 240 to the audio signal generation unit 420 may include at least one of a control parameter based on the predicted acoustic feature and a response signal based on the predicted acoustic feature.

The audio signal generation unit 420 may receive an audio signal 650 to reproduce through the audio system. Here, the audio signal generation unit 420 may modulate the audio signal based on the received acoustic feature 640 to generate an audio signal 660 optimized for the space where the audio system 100 is installed.

Finally, the audio signal generation unit 420 may transmit the audio signal 660 modulated optimally for the space to the acoustic signal output unit 220. Here, the acoustic signal output unit 220 may generate an acoustic signal based on the received audio signal 660 to output the audio signal to the speakers, thereby reproducing a sound field corresponding to the audio signal 650 optimized for the space where the audio system 100 is installed.

Figure 7:
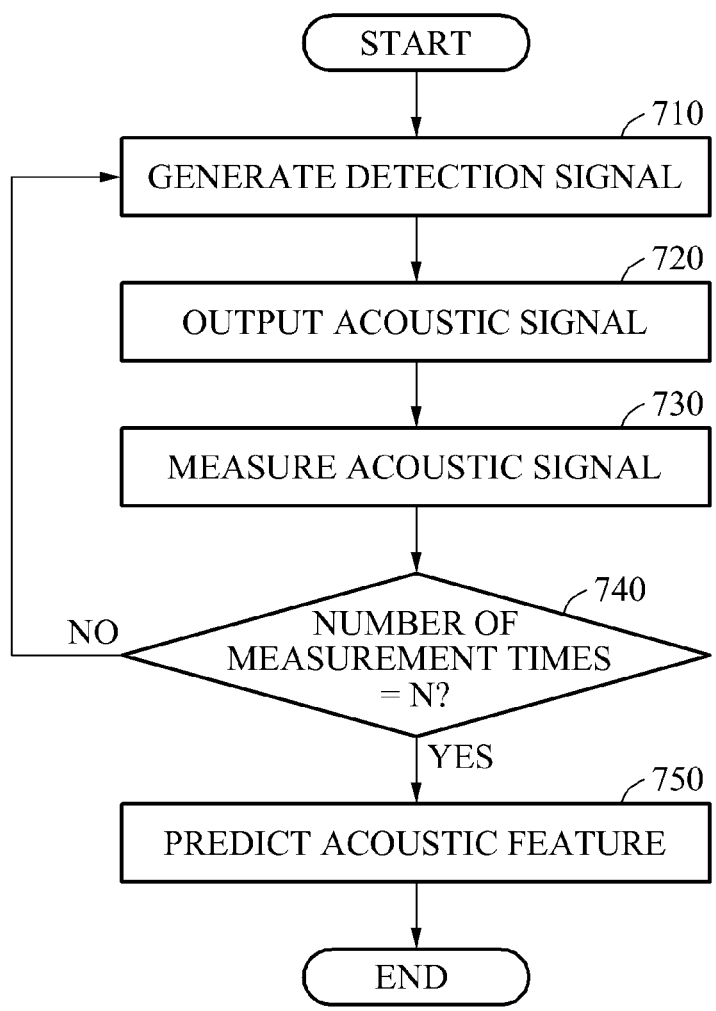
FIG. 7 is a flowchart illustrating a method of predicting an acoustic feature according to an embodiment of the present invention.

FIG. 7 is a flowchart illustrating a method of predicting an acoustic feature according to an embodiment of the present invention.

In operation 710, the detection signal generation unit 210 may generate a detection signal based on an input signal and a modulation code. Here, the input signal may be a single-channel signal for identifying an acoustic signal propagation feature between an acoustic signal sensor and speakers.

In detail, the detection signal generation unit 210 may generate a plurality of channels based on the single-channel input signal and modulate at least one of the channels using a modulation code to generate a detection signal.

In operation 720, the acoustic signal output unit 220 may generate an acoustic signal with a particular pattern based on the detection signal generated in operation 710 and output the acoustic signal to the plurality of speakers. Here, the acoustic signal output by the acoustic signal output 220 may be an acoustic signal with no directivity depending on a characteristic of the modulation code.

In operation 730, the acoustic signal measurement unit 230 may measure acoustic signals output by the speakers in operation 720 where the speakers are installed. Here, the acoustic signal measurement unit 230 may measure, using at least one acoustic signal sensor, an acoustic signal reflected from the wall among the acoustic signals output from the speakers and an acoustic signal not reflected from the wall among the acoustic signals output from the speakers.

In operation 740, the acoustic feature prediction unit 240 may verify whether the acoustic signal measurement unit 230 measures the acoustic signals N times. Here, N is a preset number of times the acoustic signals are measured, which may be a number of modulation codes used for generating the detection signal.

When the acoustic signal measurement unit 230 measures the acoustic signals N times or less, the acoustic feature prediction unit 240 may control operations 710 to 730 to be repeated until the acoustic signal measurement unit 230 measures the acoustic signals N times. When the acoustic signal measurement unit 230 measures the acoustic signals N times, the acoustic signal prediction unit 240 may perform operation 750.

In operation 750, the acoustic feature prediction unit 240 may predict acoustic features related to the speakers based on the acoustic signals measured N times in operation 740 and N modulation codes used for generating the detection signal in operation 710. For example, the acoustic feature prediction unit 240 may predict a user response to sound beams output in a plurality of directions. Also, when virtual speakers are formed at a plurality of positions using a virtual speaker forming technique, for example, WFS, the acoustic feature prediction unit 240 may predict response features of a space where the virtual speakers are formed.

Figure 8:
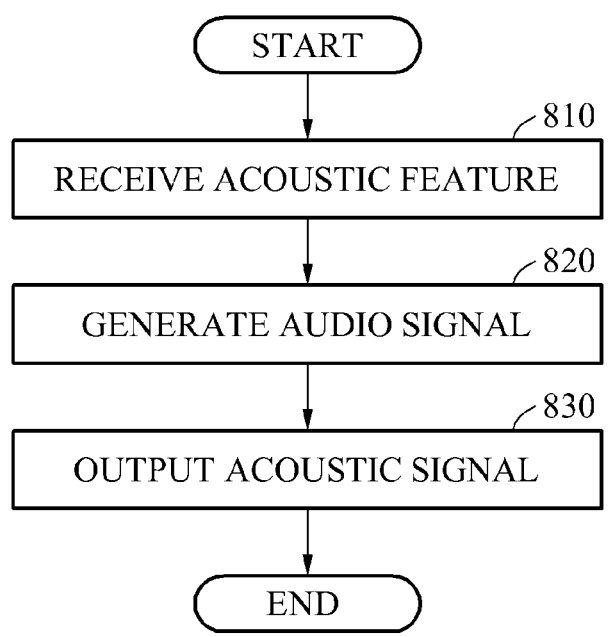
FIG. 8 is a flowchart illustrating a method of generating an audio signal according to an embodiment of the present invention.

FIG. 8 is a flowchart illustrating a method of generating an audio signal according to an embodiment of the present invention.

In operation 810, the acoustic feature reception unit 410 may receive acoustic features predicted with respect to a plurality of speakers. Here, the predicted acoustic features may acoustic features predicted by the acoustic feature prediction apparatus 110. The acoustic feature reception unit 410 may receive control parameters based on the acoustic features predicted by the acoustic feature prediction apparatus 110 or response signals based on the predicted acoustic features.

In operation 820, the audio signal generation unit 420 may modulate an audio signal based on the acoustic features received in operation 810 to generate an audio signal optimized for a space where the speakers are installed. Here, the audio signal may be a multichannel audio signal including a plurality of channels.

In operation 830, the acoustic signal output unit 430 may generate acoustic signals based on the audio signal optimized in operation 820 and output the acoustic signals to the speakers of the audio system 100.

The present invention may measure acoustic signals output based on detection signals generated using different modulation codes and predict acoustic features of speakers outputting the acoustic signals or acoustic features of a space where the speakers are installed based on the measured acoustic signals and the modulation codes, thereby accurately predicting the acoustic features of the speakers or the space of the speakers. Also, the present invention may simultaneously excite a plurality of speakers based on a detection signal to output acoustic signals, thereby minimizing effect of noise on response estimation in a particular direction.

In addition, the present invention may modulate an audio signal based on a predicted acoustic feature, thereby outputting the audio signal optimized for a space where an audio system is installed.

While the present invention has been described with reference to a few exemplary embodiments and the accompanying drawings, the present invention is not limited to the described exemplary embodiments. Instead, it would be appreciated by those skilled in the art that various modifications and variations can be made from the foregoing descriptions.

Therefore, it should be noted that the scope of the present invention is not limited by the illustrated embodiments but defined by the appended claims and their equivalents.

What is claimed is:

1. A method of predicting an acoustic feature performing by an audio system, the
    method comprising:
    generating, by an acoustic feature prediction apparatus of the audio system, a detection signal based on an input signal and a modulation code;
    generating, by an acoustic feature prediction apparatus of the audio system, an acoustic signal based on the detection signal and outputting the acoustic signal to a plurality of speakers;
    measuring, by an acoustic feature prediction apparatus of the audio system, acoustic signals output from the speakers where the speakers are installed; and
    predicting, by an acoustic feature prediction apparatus of the audio system, acoustic features related to the speakers based on the measured acoustic signals and the modulation code,
    wherein the acoustic features comprise effects of acoustics on a user based upon user location and environment where the speakers are located,
    wherein the generating of the detection signal comprises a plurality of channels based on the single-channel input signal and reversing polarity of the at least one channel of the plurality of channels with the modulation code to generate the detection signal.

2. The method of claim 1, wherein the detection signal activates at least one of the channels based on the modulation code to generate the detection signal.

3. The method of claim 1, wherein the modulation code is a digital
    modulation code for controlling whether to activate or inactivate the channels or whether to reverse polarity of the channels.

4. The method of claim 1, wherein the modulation code is configured as a combination of codes for controlling whether to activate or inactivate the channels or whether to reverse polarity of the channels.

5. The method of claim 1, wherein the acoustic signal with no directivity is generated based on the detection signal to output the acoustic signal to the plurality of speakers.

6. The method of claim 1, wherein the acoustic
    features comprise at least one of an acoustic propagation feature of each of the speakers.

7. A method of generating an audio signal performing by audio system, the method of comprising:
    receiving, by an audio signal generation apparatus of the audio system, predicted acoustic features with respect to a plurality of speakers;
    modulating, by an audio signal generation apparatus of the audio system, an audio signal based on the acoustic features to generate an audio signal optimized for a space where the speakers are installed; and
    generating, by an audio signal generation apparatus of the audio system, an acoustic signal based on the optimized audio signal to output the acoustic signal to the speakers,
    wherein the acoustic features comprise effects of acoustics on a user based upon user location and environment where the speakers are located,
    wherein the acoustic features are predicted based on measured acoustic signals and a modulation code by generating a detection signal based on a single-channel input signal and the modulation code and measuring an acoustic signal output based on the detection signal where the speakers are installed,
    wherein the generating the detection signal comprises generating a plurality of channels based on the single-channel input signal and reversing polarity of the at least one channel of the plurality of channels with the modulation code to generate the detection signal.

8. The method of claim 7, wherein the acoustic features comprise at least one of an acoustic propagation feature of each of the speakers.

9. An acoustic feature prediction apparatus of the audio system, the acoustic feature prediction apparatus executes the below steps:

generate a detection signal based on a single-channel input signal and a modulation code;
generate an acoustic signal based on the detection signal and to output the acoustic signal to a plurality of speakers;
measure acoustic signals output from the speakers where the speakers are installed; and
predict acoustic features related to the speakers based on the measured acoustic signals and the modulation code,
wherein the acoustic features comprise effects of acoustics on a user based upon user location and environment where the speakers are located,
wherein instructions to generate the detection signal generate a plurality of channels based on a single-channel input signal and reverses polarity of the at least one channel of the plurality of channels with the modulation code to generate the detection signal.

10. The apparatus of claim 9, wherein the detection signal activates at least one of the channels based on the modulation code to generate the detection signal.

11. The apparatus of claim 9, wherein an acoustic signal with no directivity is generated based on the detection signals to output the acoustic signal to the plurality of speakers.

12. The apparatus of claim 9, wherein the acoustic features comprise at least one of an acoustic propagation feature of each of the speakers.

\* \* \* \* \*